United States Patent
Moniz et al.

(10) Patent No.: US 10,060,290 B2
(45) Date of Patent: Aug. 28, 2018

(54) METHOD AND SYSTEM FOR CENTRIFUGAL PUMP

(71) Applicant: General Electric Company, Schenectady, NY (US)

(72) Inventors: Thomas Ory Moniz, Loveland, OH (US); Thomas Lee Becker, Jr., Symmes Township, OH (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 14/984,372

(22) Filed: Dec. 30, 2015

(65) Prior Publication Data
US 2017/0191378 A1    Jul. 6, 2017

(51) Int. Cl.
*F01D 25/20*    (2006.01)
*F01D 25/18*    (2006.01)
(Continued)

(52) U.S. Cl.
CPC .............. *F01D 25/20* (2013.01); *F01D 5/06* (2013.01); *F01D 25/18* (2013.01); *F04D 29/321* (2013.01); *F01D 25/162* (2013.01); *F01D 25/183* (2013.01); *F04D 1/12* (2013.01); *F05D 2220/32* (2013.01); *F05D 2240/60* (2013.01); *F05D 2260/98* (2013.01); *Y02T 50/671* (2013.01)

(58) Field of Classification Search
CPC ........ F01D 25/18; F01D 25/20; F01D 25/162; F01D 25/183; F04D 1/12
See application file for complete search history.

(56) References Cited

U.S. PATENT DOCUMENTS

| 1,216,235 A | | 2/1917 | Bernhard |
| 2,376,071 A | * | 5/1945 | Miess ..................... F04D 1/12 |
| | | | 415/88 |

(Continued)

FOREIGN PATENT DOCUMENTS

| GB | 493333 A | * | 10/1938 | ............... F04D 1/12 |

OTHER PUBLICATIONS

Extended European Search Report and Opinion issued in connection with corresponding EP Application No. 16203873.1 dated Jul. 17, 2017.

*Primary Examiner* — Justin Seabe
*Assistant Examiner* — Behnoush Haghighian
(74) *Attorney, Agent, or Firm* — General Electric Company; Pamela Kachur

(57) ABSTRACT

The pump includes a first rotatable member including a radially inward facing groove having an edge. The first rotatable member configured to receive a plurality of flows of fluid over the edge. The first rotatable member configured to rotate at a first angular velocity. The pump also includes a second rotatable member including a collector configured to rotate at a second angular velocity. The second rotatable member also includes a plurality of scoop tubes extending radially outwardly from the collector. Each scoop tube of the plurality of scoop tubes includes a first end coupled in flow communication to the collector and a second end including an inlet opening extending into the groove. The second end curved such that the inlet opening is open in a direction of rotation of the second rotatable member. The inlet opening configured to scoop a fluid collected in the groove.

16 Claims, 4 Drawing Sheets

(51) Int. Cl.
*F01D 5/06* (2006.01)
*F04D 29/32* (2006.01)
*F01D 25/16* (2006.01)
*F04D 1/12* (2006.01)

(56) References Cited

U.S. PATENT DOCUMENTS

| | | | | |
|---|---|---|---|---|
| 2,690,130 A | * | 9/1954 | Boeckeler | F04D 1/12 |
| | | | | 415/89 |
| 2,747,514 A | | 5/1956 | Edwards | |
| 2,974,602 A | * | 3/1961 | Lock | B64D 37/16 |
| | | | | 494/43 |
| 4,230,564 A | * | 10/1980 | Keefer | B01D 61/08 |
| | | | | 210/321.6 |
| 4,453,784 A | * | 6/1984 | Kildea | F01D 25/18 |
| | | | | 184/6.11 |
| 4,468,066 A | * | 8/1984 | Alcorta | F01D 25/18 |
| | | | | 384/462 |
| 4,548,545 A | * | 10/1985 | Lewis | F04D 1/12 |
| | | | | 415/169.1 |
| 4,767,281 A | | 8/1988 | Sailer | |
| 5,319,920 A | | 6/1994 | Taylor | |
| 7,458,202 B2 | | 12/2008 | Moniz et al. | |
| 8,210,316 B2 | | 7/2012 | Dibenedetto et al. | |
| 8,256,576 B2 | | 9/2012 | Glahn et al. | |
| 9,726,040 B2 | * | 8/2017 | Gekht | F01D 25/18 |
| 2014/0174858 A1 | | 6/2014 | Remer et al. | |
| 2015/0125264 A1 | | 5/2015 | Lighty et al. | |
| 2016/0281602 A1 | * | 9/2016 | Gekht | F01D 25/164 |

\* cited by examiner

METHOD AND SYSTEM FOR CENTRIFUGAL PUMP

BACKGROUND

The field of the disclosure relates generally to pumping systems in a gas turbine engines and, more particularly, to a method and system for pumping oil in a gas turbine engine using a centrifugal pump.

Scavenge oil, i.e., oil drained to an oil sump after lubricating bearings in gas turbine engines, is typically sent to a scavenge oil tank after lubricating the bearings. At least some known methods of transporting scavenge oil to a scavenge oil tank include a gravitational drain through a hot frame. As gas turbine engines become more powerful, the temperatures the hot frame is exposed to also increase. Transporting scavenge oil in the hot frame can cause the scavenge oil to coke because of the high temperatures the hot frame is exposed to. To reduce scavenge oil coking, cooling air is supplied to the hot frame to cool the scavenge oil as it is transported through the hot frame. Additionally, the hot frame strut thickness is increased to protect the scavenge oil drain piping. An additional cooling air system and a thicker hot frame strut adds weight to the gas turbine engine.

BRIEF DESCRIPTION

In one aspect, a pump is provided. The pump includes a first rotatable member including a radially inward facing groove having an edge. The first rotatable member configured to receive a plurality of flows of fluid over the edge. The first rotatable member configured to rotate at a first angular velocity. The pump also includes a second rotatable member including a collector configured to rotate at a second angular velocity. The second rotatable member also includes a plurality of scoop tubes extending radially outwardly from the collector. Each scoop tube of the plurality of scoop tubes includes a first end coupled in flow communication to the collector and a second end including an inlet opening extending into the groove. The second end is curved such that the inlet opening is open in a direction of rotation of the second rotatable member. The inlet opening is configured to scoop a fluid collected in the groove.

In another aspect, a method of pumping a fluid using a pump that includes a first rotatable member including a circumferential groove on a radially inner surface and a second rotatable member including one or more scoop tubes extending into the groove. The method includes receiving a flow of fluid at the first rotatable member. The first rotatable member circumscribes the second rotatable member. The method also includes centrifugally collecting the flow of fluid in a radially outer portion of the groove. The method further includes scooping a portion of the centrifugally collected fluid into the one or more scoop tubes. The method also includes channeling the scooped fluid to a fluid scavenge system.

In yet another aspect, a gas turbine engine is provided. The gas turbine engine includes a high pressure power shaft rotationally coupled to a high pressure compressor and a high pressure turbine. The gas turbine engine also includes a low pressure power shaft rotationally coupled to a low pressure compressor and a low pressure turbine. The gas turbine engine further includes a pump including a first rotatable member including a radially inward facing groove having an edge. The first rotatable member configured to receive a plurality of flows of fluid over the edge. The low pressure power shaft configured to rotate the first rotatable member at a first angular velocity. The pump also includes a second rotatable member including a collector rotationally coupled to the high pressure power shaft and configured to rotate at a second angular velocity. The second rotatable member also includes a plurality of scoop tubes extending radially outwardly from the collector. Each scoop tube of the plurality of scoop tubes includes a first end coupled in flow communication to the collector and a second end including an inlet opening extending into the groove. The second end curved such that the inlet opening is open in a direction of rotation of the second rotatable member. The inlet opening is configured to scoop a fluid collected in the groove.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic view of a gas turbine engine.

FIG. 2 is a schematic view of a low pressure turbine within a gas turbine engine.

FIG. 3 is a schematic diagram of a scavenge oil pump.

FIG. 4 is a schematic diagram of rotating oil groove or plenum.

Figure 1:
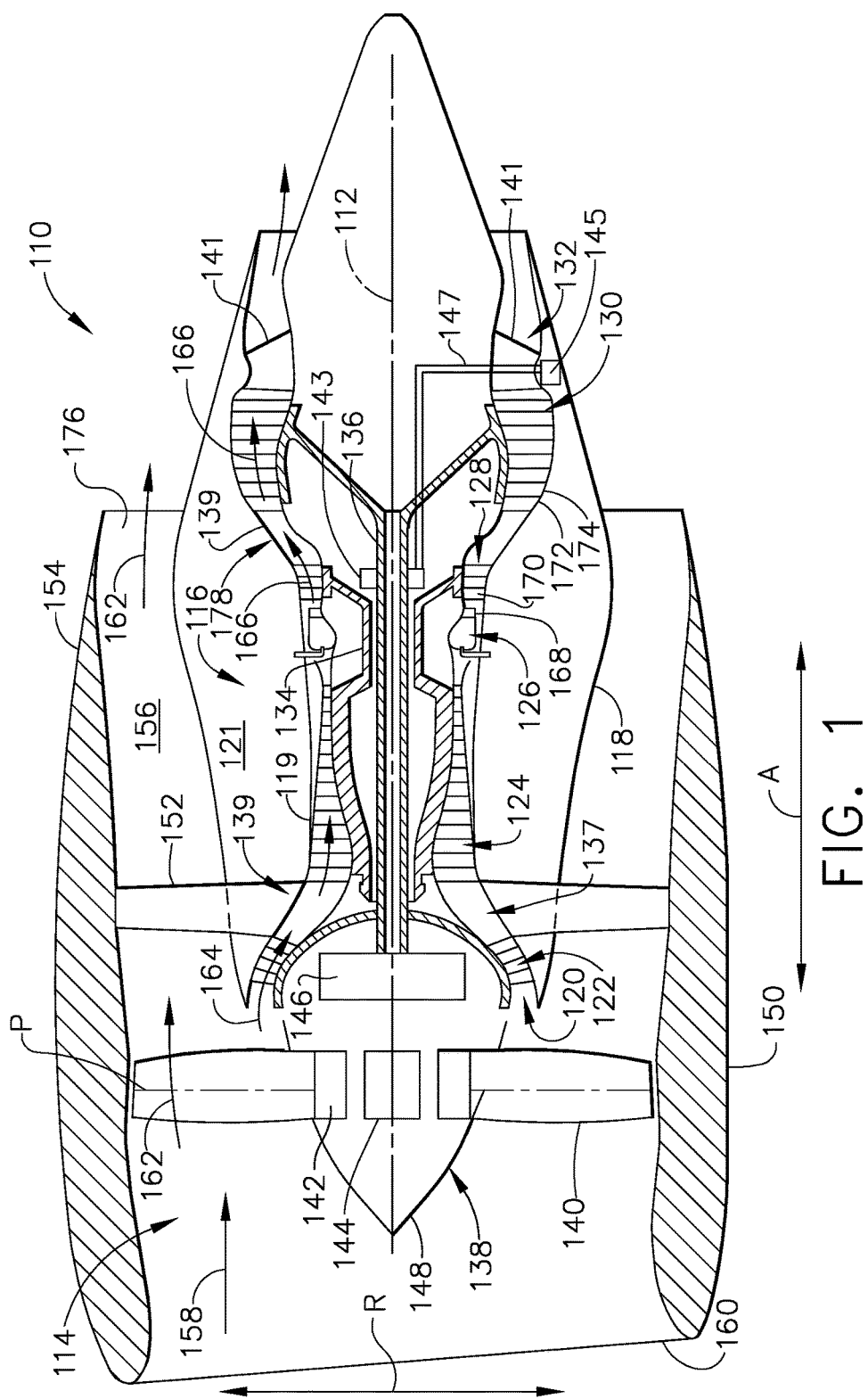
FIGS. 1-4 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

The following detailed description illustrates embodiments of the disclosure by way of example and not by way of limitation. It is contemplated that the disclosure has general application to a method and system for circulating oil in an aircraft engine.

Embodiments of the pump described herein pump scavenge oil to an turbine rear frame (TRF). The pump includes a rotating oil plenum circumscribing a rotating tube assembly. Scavenge oil drains into the rotating oil plenum which rotates to form a uniform pool of oil. Rotating tube assembly includes a plurality of scoop tubes extending into the uniform pool of oil. Rotation of rotating tube assembly channels scavenge oil into the scoop tubes. The scoop tubes channel scavenge oil axially aft to an TRF. Scavenge oil drains through the TRF to a scavenge oil system. In an exemplary embodiment, the rotating oil plenum and the rotating tube assembly rotate in opposite directions. In an alternative embodiment, the rotating oil plenum and the rotating tube assembly rotate in the same direction. In an alternative embodiment, the rotating oil plenum is configured to rotate and the rotating tube assembly is configured to remain stationary.

The pumps and scavenge oil transport systems described herein offer advantages over known methods of transporting scavenge oil in a gas turbine engine. More specifically, some known methods and systems of transporting scavenge oil include transporting scavenge oil through a turbine center frame (TCF). TCFs typically operate at higher temperatures, requiring cooling air and TCF struts to prevent scavenge oil coking in the scavenge oil drain line. Draining scavenge oil through a cooler TRF removes the need for cooling air in the TCF and allows the TCF to use thinner struts. A thinner TCF strut reduces the weight of the engine and improves the performance of the engine.

Figure 2:
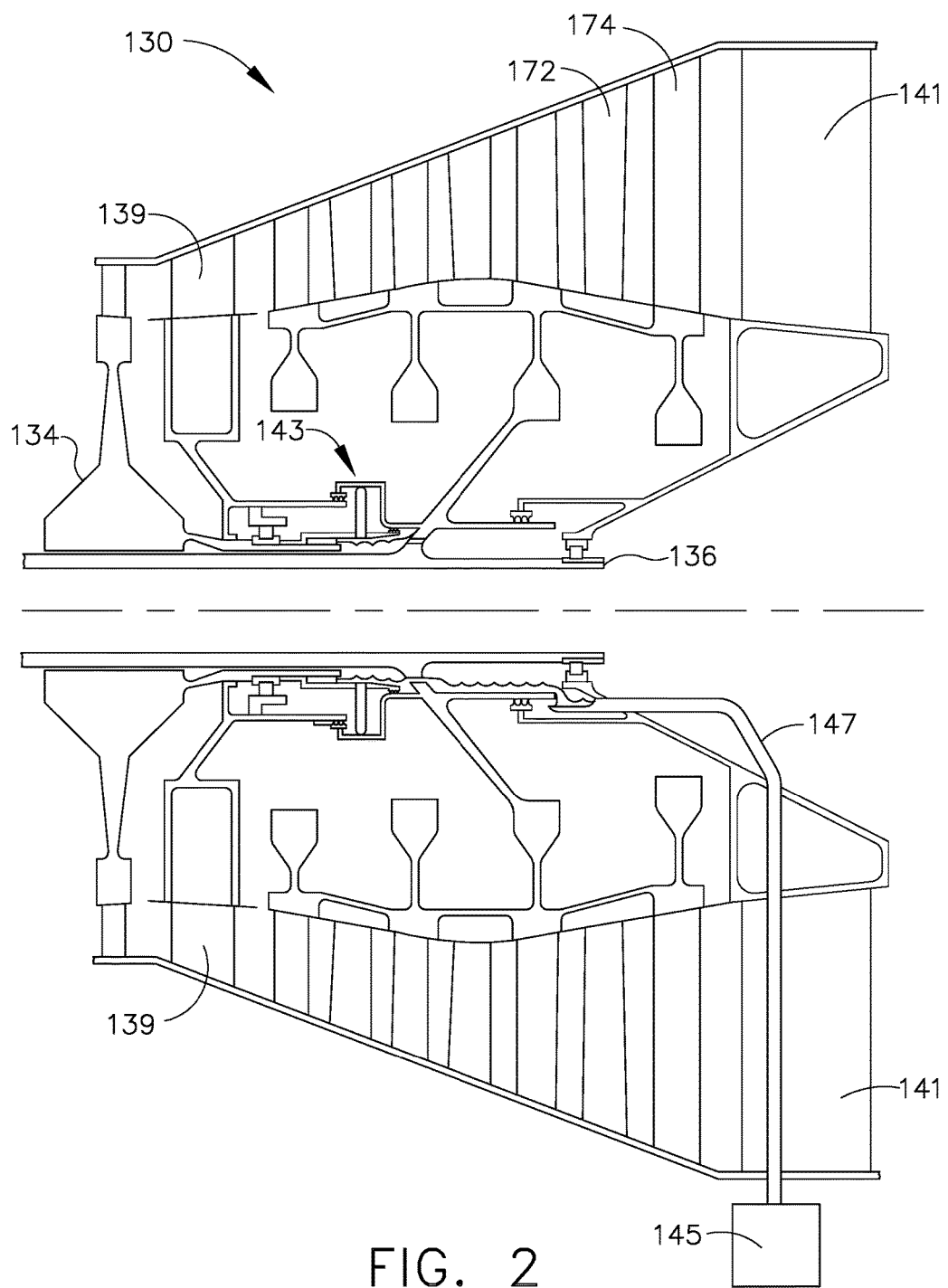

FIG. 1 is a schematic cross-sectional view of a gas turbine engine 110 in accordance with an exemplary embodiment of the present disclosure. FIG. 2 is a schematic cross-sectional view of a (LP) low pressure turbine 130 within gas turbine engine 110 in accordance with an exemplary embodiment of the present disclosure. In the example embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan 110 includes a fan section 114 and a core turbine engine 116 disposed downstream from fan section 114.

Exemplary core turbine engine 116 depicted generally in FIG. 1 includes a substantially tubular outer casing 118 that defines an annular inlet 120. Outer casing 118 and a substantially tubular inner casing 119 encases, in serial flow relationship, a compressor section including a booster or low pressure (LP) compressor 122 and a high pressure (HP) compressor 124; a turbine center frame (TCF) 139 and an turbine rear frame (TRF) 141; a combustion section 126; a turbine section including a high pressure (HP) turbine 128 and LP turbine 130; and a jet exhaust nozzle section 132. The volume between outer casing 118 and inner casing 119 forms a plurality of cavities 121. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and nozzle section 132 together define a core air flowpath 137.

Referring to FIG. 2, a scavenge oil pump 143 is coupled to HP shaft or spool 134 and LP shaft or spool 136. A scavenge oil system 145 is disposed within cavity 121. Scavenge oil pump 143 and scavenge oil system 145 are coupled in flow communication by a scavenge oil drain pipe 147. Scavenge oil drain pipe 147 extends generally along axial direction A aft of scavenge oil pump 143 to TRF 141. Scavenge oil drain pipe 147 extends generally along radial direction R through TRF 141 to scavenge oil system 145.

Referring back to FIG. 1, for the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed.

Referring still to the exemplary embodiment of FIG. 1, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. It should be appreciated that nacelle 150 may be configured to be supported relative to core turbine engine 116 by a plurality of circumferentially-spaced outlet guide vanes 152. In the exemplary embodiment, outlet guide vanes 152 include engine oil heat exchangers. Moreover, a downstream section 154 of nacelle 150 may extend over an outer portion of core turbine engine 116 so as to define a bypass airflow passage 156 therebetween.

During operation of turbofan engine 110, a volume of air 158 enters turbofan 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 and HP turbine rotor blades 170. HP turbine stator vanes 168 are coupled to outer casing 118. HP turbine rotor blades 170 are coupled to HP shaft or spool 134. Rotation of HP turbine rotor blades 170 causes HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 and LP turbine rotor blades 174. LP turbine stator vanes 172 are coupled to outer casing 118. LP turbine rotor blades 174 are coupled to LP shaft or spool 136. Rotation of LP turbine rotor blades 174 causes LP shaft or spool 136 to rotate, thereby supporting operation of LP compressor 122 and/or rotation of fan 138.

Referring to FIG. 2, Oil lubricates components of gas turbine engine 110. Scavenge oil collects in sumps and drains to scavenge oil pump 143. Scavenge oil pump 143 channels a plurality of flows of scavenge oil to scavenge oil drain pipe 147 which channels scavenge oil to scavenge oil system 145.

Referring back to FIG. 1, Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan 110, also providing propulsive thrust. HP turbine 128, LP turbine 130, and jet exhaust nozzle section 132 at least partially define a hot gas path 178 for routing combustion gases 166 through core turbine engine 116.

It should be appreciated, however, that exemplary turbofan engine 110 depicted in FIG. 1 and FIG. 2 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 3:
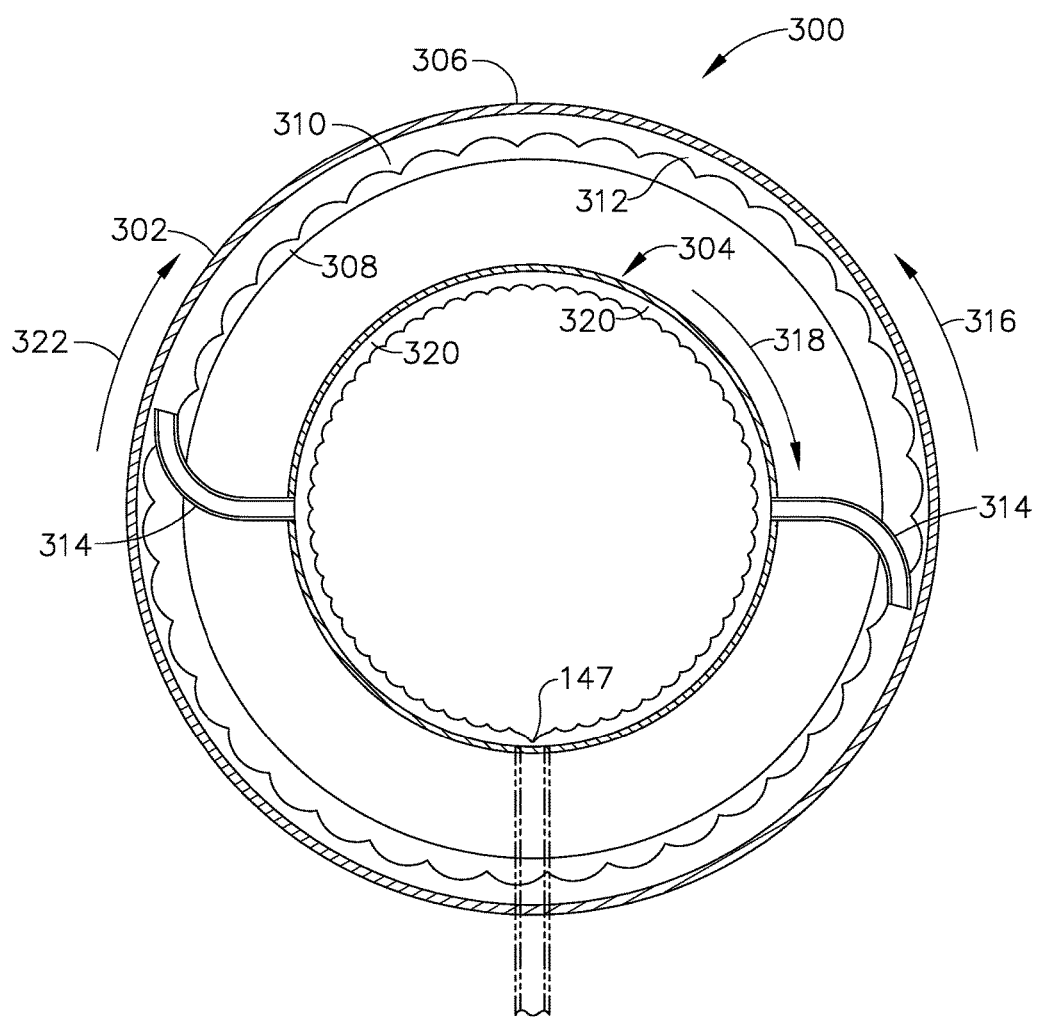
Figure 4:
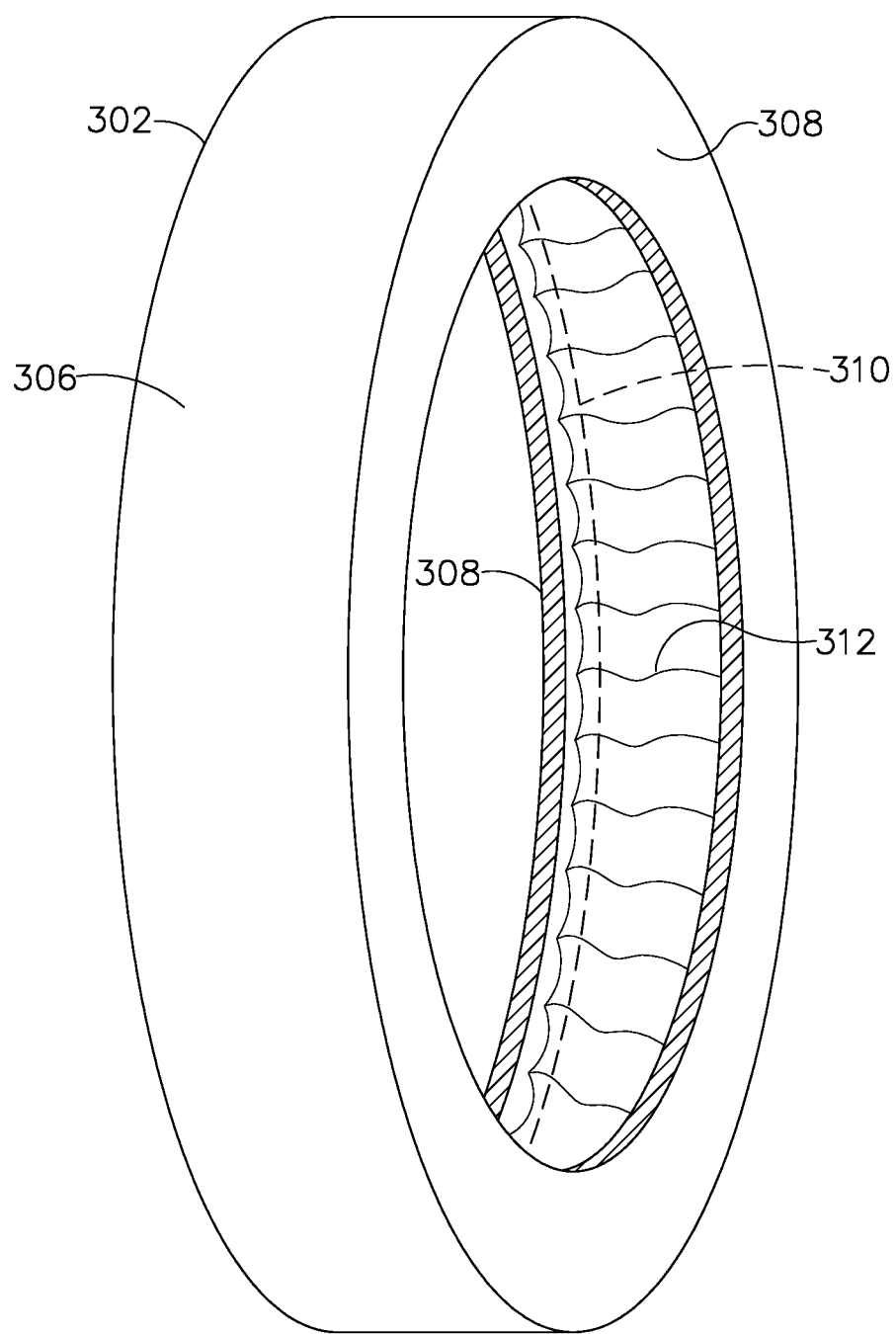

FIG. 3 is a schematic diagram of scavenge oil pump 143. Scavenge oil pump 143 includes a rotating oil groove or plenum 302 circumscribing a rotating scoop tube assembly 304. FIG. 4 is a schematic diagram of rotating oil groove or plenum 302. Rotating oil plenum 302 includes a cylinder 306 and two side walls 308 coupled to and extending generally along radial direction R inward from each end of cylinder 306 forming a U-shaped plenum 310 to contain a uniform pool of oil 312. Rotating oil plenum 302 is rotationally coupled to LP shaft or spool 136. Rotating scoop tube assembly 304 includes a plurality of scoop tubes 314 extending generally along radial direction R outward from centerline 112 into uniform pool of oil 312. Scoop tubes 314 are coupled in flow communication with stationary scavenge oil drain pipe 147 at the bottom of the sump. Rotating scoop tube assembly 304 is rotationally coupled to HP shaft or spool 134.

During operation of scavenge oil pump 143, scavenge oil collects in sumps and drains into rotating oil plenum 302. LP shaft or spool 136 rotates rotating oil plenum 302 with a first angular velocity as indicated by arrow 316. Centrifugal force from rotation of rotating oil plenum 302 forms drained scavenges oil into uniform pool of oil 312. HP shaft or spool 134 rotates rotating scoop tube assembly 304 with a second angular velocity as indicated by arrow 318. First angular velocity 316 rotates in an opposite direction from second angular velocity 318 because HP shaft or spool 134 rotates counter to LP shaft or spool 136. Scavenge oil is channeled into scoop tubes 314 which channels scavenge oil into stationary scavenge oil drain pipe 147 as indicated by arrows 320. Scavenge oil drain pipe 147 channels oil to scavenge oil system 145 located at the bottom of gas turbine engine 110 (shown in FIG. 1).

In an alternative embodiment, rotating oil plenum 302 and rotating scoop tube assembly 304 are configured to rotate in the same direction rather than opposite directions. Rotating oil plenum 302 rotates in the direction of a third angular velocity as indicated by arrow 322. The rotational direction of second angular velocity 318 and third angular velocity 322 are equal. However, the magnitude of rotational speed of second angular velocity 318 and third angular velocity 322 are unequal to channel scavenge oil into scoop tubes 314.

In an alternative embodiment, rotating oil plenum 302 is configured to rotate and rotating scoop tube assembly 304 is configured to remain stationary. Rotating oil plenum 302 rotates in the direction of first angular velocity 316. Rotation of rotating oil plenum 302 channels scavenge oil into scoop tubes 314.

The above-described pump provides an efficient method for transporting scavenge oil in a gas turbine engine. Specifically, the above-described pump pumps scavenge oil to an inner radius of a gas turbine engine. Scavenge oil is channeled aft to a TRF which experiences cooler operating temperatures than TCFs. Channeling scavenge oil through a TRF allows reduction of the thickness of the TFC. Reduced TFC strut thickness reduces the weight of the gas turbine engine. As such, channeling scavenge oil through a TRF improves the performance of the gas turbine engine. Additionally, channeling scavenge oil through a TRF eliminates the need for cooling air in the TFC to reduce scavenge oil coking.

Exemplary embodiments of a pump for scavenge oil are described above in detail. The pump, and methods of operating such systems and devices are not limited to the specific embodiments described herein, but rather, components of systems and/or steps of the methods may be utilized independently and separately from other components and/or steps described herein. For example, the methods may also be used in combination with other systems requiring scavenge oil pumping, and are not limited to practice with only the systems and methods as described herein. Rather, the exemplary embodiment can be implemented and utilized in connection with many other machinery applications that are currently configured to receive and accept pumps.

Example methods and apparatus for a pump in a gas turbine engine are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A pump comprising:
   a first rotatable member comprising a radially inward facing groove having an edge, said first rotatable member configured to receive a plurality of flows of fluid over the edge, said first rotatable member configured to rotate at a first angular velocity; and
a second rotatable member comprising:
a collector configured to rotate at a second angular velocity;
wherein said first angular velocity is less then said second angular velocity; and
a plurality of scoop tubes extending radially outwardly from said collector, each scoop tube of said plurality of scoop tubes comprising:
a first end coupled in flow communication to said collector;
a second end comprising an inlet opening extending into the groove, said second end curved such that said inlet opening is open in a direction of rotation of said second rotatable member, said inlet opening configured to scoop a fluid collected in said groove; and
wherein said first rotatable member is configured to rotate in the same direction as the direction of rotation of said second rotatable member.

2. The pump of claim 1, wherein said first angular velocity is opposite with respect to said second angular velocity.

3. The pump of claim 1, wherein said fluid comprises oil.

4. A pump comprising:
a first rotatable member comprising a radially inward facing grove having an edge, said first rotatable member configured to receive a plurality of flows of fluid over the edge, said first rotatable member configured to rotate at a first angular velocity; and
a second rotatable member comprising:
a collector configured to rotate at a second angular velocity; and
a plurality of scoop tubes extending radially outwardly from said collector, each scoop tube of said plurality of scoop tubes comprising:
a first end coupled in flow communication to said collector;
a second end comprising an inlet opening extending into the grove, said second end curved such that said inlet opening is open in a direction of rotation of said second rotatable member, said inlet opening configured to scoop a fluid collected in said grove; and
wherein said first rotatable member configured to receive a plurality of flows of fluid over the edge from a plurality of sumps.

5. A method of pumping a fluid using a pump that includes a first rotatable member including a circumferential groove on a radially inner surface and a second rotatable member including one or more scoop tubes extending into the groove, said method comprising:
receiving a flow of fluid at the first rotatable member, the first rotatable member circumscribing the second rotatable member;
centrifugally collecting the flow of fluid in a radially outer portion of the groove;
scooping a portion of the centrifugally collected fluid into the one or more scoop tubes;
channeling the scooped fluid to a fluid scavenge system; and
further comprising channeling the scooped fluid into a stationary axial drain tube extending axially aft in a gas turbine engine.

6. The method of claim 5, wherein scooping a portion of the centrifugally collected fluid into the one or more scoop tubes comprises rotating the second rotatable member in a direction opposite the direction of rotation of the first rotatable member.

7. The method of claim 5, wherein scooping a portion of the centrifugally collected fluid into the one or more scoop tubes comprises rotating the second rotatable member in the same direction as the direction of rotation of the first rotatable member.

8. The method of claim 5, further comprising channeling the scooped fluid into a radial drain tube extending radially downward through an aft engine frame to the bottom of a gas turbine engine.

9. The method of claim 8, wherein receiving a flow of fluid at the first rotatable member comprises receiving a flow of fluid at the first rotatable member from a plurality of sumps.

10. The method of claim 8, wherein channeling the scooped fluid into a radial drain tube extending radially outward through an aft engine frame in a gas turbine engine comprises gravity draining the scooped fluid into a radial drain tube extending radially outward through an aft engine frame in a gas turbine engine.

11. A gas turbine engine comprising:
a high pressure power shaft rotationally coupled to a high pressure compressor and a high pressure turbine;
a low pressure power shaft rotationally coupled to a low pressure compressor and a low pressure turbine;
a pump comprising:
a first rotatable member comprising a radially inward facing groove having an edge, said first rotatable member configured to receive a plurality of flows of fluid over the edge, said low pressure power shaft configured to rotate said first rotatable member at a first angular velocity; and
a second rotatable member comprising:
a collector rotationally coupled to said high pressure power shaft and configured to rotate at a second angular velocity; and
a plurality of scoop tubes extending radially outwardly from said collector, each scoop tube of said plurality of scoop tubes comprising:
a first end coupled in flow communication to said collector; and
a second end comprising an inlet opening extending into the groove, said second end curved such that said inlet opening is open in a direction of rotation of said second rotatable member, said inlet opening configured to scoop a fluid collected in said groove.

12. The gas turbine engine of claim 11, wherein said first rotatable member configured to rotate in a direction opposite a direction of rotation of said second rotatable member.

13. The gas turbine engine of claim 11, wherein said first rotatable member configured to rotate in the same direction as the direction of rotation of said second rotatable member.

14. The gas turbine engine of claim 11, wherein said first rotatable member configured to receive a plurality of flows of fluid over the edge from a plurality of sumps.

15. The gas turbine engine of claim 11, wherein said fluid comprises oil.

16. The gas turbine engine of claim 11 further comprising a fluid collection system coupled in flow communication with said pump by a drain tube, said drain tube extending axially aft from said pump and extending radially downward through an aft engine frame to said fluid collection system.

* * * * *